(12) United States Patent
Manasse et al.

(10) Patent No.: US 11,374,912 B2
(45) Date of Patent: Jun. 28, 2022

(54) METHODS AND SYSTEMS FOR PERFORMING EXCHANGE OF DATA WITH THIRD-PARTY APPLICATIONS

(71) Applicant: i2Chain, Inc., San Ramon, CA (US)

(72) Inventors: Mark Steven Manasse, San Francisco, CA (US); Sanjay Jain, Sammamish, WA (US); Ravi Jotwani, San Ramon, CA (US); Ajay Jotwani, San Ramon, CA (US)

(73) Assignee: I2CHAIN, INC., San Ramon, CA (US)

( * ) Notice: Subject to any disclaimer, the term of this patent is extended or adjusted under 35 U.S.C. 154(b) by 95 days.

(21) Appl. No.: 17/114,157

(22) Filed: Dec. 7, 2020

(65) Prior Publication Data
US 2021/0218719 A1    Jul. 15, 2021

Related U.S. Application Data

(60) Provisional application No. 62/960,639, filed on Jan. 13, 2020.

(51) Int. Cl.
*H04L 9/40* (2022.01)
*H04L 9/30* (2006.01)

(52) U.S. Cl.
CPC ........ *H04L 63/0442* (2013.01); *H04L 9/3073* (2013.01); *H04L 63/08* (2013.01)

(58) Field of Classification Search
CPC ... H04L 9/0894; H04L 63/08; H04L 63/0442; H04L 9/0891; H04L 9/3073; H04L 2209/80
USPC ........................................................ 713/191
See application file for complete search history.

(56) References Cited

U.S. PATENT DOCUMENTS

| | | | |
|---|---|---|---|
| 7,577,840 B2 | 8/2009 | England et al. | |
| 7,827,114 B2 | 11/2010 | Pinkas et al. | |
| 8,627,223 B1 | 1/2014 | Katzer et al. | |
| 8,863,252 B1 | 10/2014 | Katzer et al. | |
| 2007/0124247 A1 | 5/2007 | Pinkas et al. | |
| 2007/0276768 A1 | 11/2007 | Pallante | |
| 2016/0283920 A1* | 9/2016 | Fisher | G06Q 20/065 |
| 2017/0344949 A1* | 11/2017 | Nittala | G06Q 10/101 |

* cited by examiner

*Primary Examiner* — Benjamin A Kaplan
(74) *Attorney, Agent, or Firm* — Kanika Radhakrishnan; Evergreen Valley Law Group

(57) ABSTRACT

Methods and systems for performing exchange of data with third-party applications are described. The method includes receiving a request for performing document related operation on document using a third-party application. The method includes converting third-party application into containerized application using containerization mechanism. The method includes allocating virtual secured space to containerized application. The method includes encrypting document using public key of containerized application. The method includes providing encrypted document to containerized application that implements limitations on encrypted document. The method includes facilitating performance of document related operation on encrypted document to create updated document. The encrypted document is decrypted using private key of containerized application before performing document related operation on encrypted document. The method includes decrypting updated document re-encrypted by third-party application using encryption key. The method further includes storing updated document in virtual secured space.

20 Claims, 10 Drawing Sheets

METHODS AND SYSTEMS FOR PERFORMING EXCHANGE OF DATA WITH THIRD-PARTY APPLICATIONS

TECHNICAL FIELD

Embodiments of the disclosure relate generally to a field of information security and, more particularly to, methods and systems for performing exchange of data with (non) trusted third-party applications.

BACKGROUND

Currently, security of applications and associated data is of high importance as use of network-based computing for accessing the data associated with the applications is proliferated. For example, a network of computing devices may be utilized to provide a robust set of services to their users. Within the network, a first computer system or a user may trust a second computer system, or an application suite, or a second user to respect a level of access granted i.e. the second computer system or the second user may be privileged with certain access rights such as the ability to create, read, copy, print, update, and/or delete data of the first computer system or the user and the second computer system or the second user is trusted to abide by the granted access rights. The second computer system, or the second user may also be trusted to store data associated with the first computer system or the user. With such configurations of computing resources, ensuring that access to the resources and the data is managed correctly can be challenging, especially when the size and complexity of such configurations grow.

In some cases, users or third parties may use their personal computer for work-related computing which may result in storing sensitive corporate documents and application information to an unsecured storage location. The memory of such storage locations is typically unmanaged, and it may be difficult to enforce security policies when a user is not logged into a corporate network. Furthermore, personal computers have more risk of being hacked or stolen than corporate computers that are protected by security policies and firewalls, which further increases risk of leaking sensitive corporate documents.

Generally, corporate data is stored in an encrypted form to prevent access by malicious third parties. While this adds security to the corporate data, there may still exist some risks. For example, the corporate enterprise, which may own the data, may be unable to access the encrypted space without the user's password. Further, if the user forgets the password, an administrator may not be able to recover the encrypted corporate data. While the corporate enterprise may store the user passwords in a central database, decryption of the corporate data, in case the user forgets the password, may require transmission of passwords over a network where they can be intercepted. The interception of the passwords can significantly compromise the security of the corporate data. Further, if a rogue application or unauthorized application also registers itself on the same device, the rogue application can receive the corporate data and may be able to access and freely redistribute all the corporate data that is present in the storage.

Hence, there is a need of techniques that help in establishing exchange of data with (non) trusted third-party applications while maintaining security of the data.

SUMMARY

Various embodiments of the present disclosure provide methods and systems for performing exchange of data with (non) trusted third-party applications.

In an embodiment, a computer-implemented method is disclosed. The method includes receiving a request for performing at least one document related operation on a document using a third-party application installed on a user device associated with a user. The method includes converting the third-party application into a containerized application using a containerization mechanism. The method includes allocating a virtual secured space to the containerized application. The method includes encrypting the document using a public key of an asymmetric key pair of the containerized application. The method includes providing the encrypted document to the containerized application. The encrypted document includes a header field including a plurality of access rights of the containerized application and an encryption key. The containerized application implements one or more limitations on the encrypted document corresponding to the plurality of access rights of the containerized application. The method includes facilitating performance of the at least one document related operation on the encrypted document to create an updated document based at least on the plurality of access rights and the one or more limitations. The encrypted document is decrypted using a private key of the asymmetric key pair by the third-party application before performing the at least one document related operation on the encrypted document. The method includes decrypting the updated document re-encrypted by the third-party application using the encryption key. The method further includes storing the updated document in the virtual secured space allocated to the containerized application.

In another embodiment, a server system is disclosed. The server system includes a communication interface to receive a request for performing at least one document related operation on a document using a third-party application installed on a user device associated with a user. The server system also includes a memory including executable instructions and a processor communicably coupled to the communication interface and configured to execute the instructions and thereby cause the server system to convert the third-party application into a containerized application using a containerization mechanism. The server system is further configured to allocate a virtual secured space to the containerized application. The server system is further configured to encrypt the document using a public key of an asymmetric key pair of the containerized application. The server system is further configured to provide the encrypted document to the containerized application. The encrypted document includes a header field including a plurality of access rights of the containerized application and an encryption key. The containerized application implements one or more limitations on the encrypted document corresponding to the plurality of access rights of the containerized application. The server system is further configured to facilitate performing of the at least one document related operation on the encrypted document to create an updated document based at least on the plurality of access rights and the one or more limitations. The encrypted document is decrypted using a private key of the asymmetric key pair by the third-party application before performing the at least one document related operation on the encrypted document. The server system is further configured to decrypt the updated document re-encrypted by the third-party application using the encryption key. The server system is further configured to store the updated document in the virtual secured space allocated to the containerized application.

In yet another embodiment, a computer-implemented method is disclosed. The method includes receiving a request for performing at least one document related operation on a document using a third-party application installed on a user device associated with a user. The method includes determining whether the third-party application is capable of recognizing a plurality of access rights granted to the third-party application. The method includes creating a wrapper suite for the third-party application if the third-party application is incapable of recognizing the plurality of access rights. The wrapper suite embeds an editing window of the third-party application into a frame to impose one or more operation restrictions on the third-party application. The one or more operation restrictions are created based on the plurality of access rights of the third-party application. The method includes applying the wrapper suite to the third-party application. The method includes allocating a virtual secured space to the third-party application. The method includes providing the document to the third-party application. The document is encrypted using a public key of an asymmetric key pair of the third-party application. The method includes facilitating performance of the at least one document related operation on the encrypted document to create an updated document based on the one or more operation restrictions. The encrypted document is decrypted using a private key of the asymmetric key pair by the third-party application before performing the at least one document related operation on the encrypted document. The method includes decrypting the updated document re-encrypted by the third-party application using an encryption key. The encryption key is included in a header field of the encrypted document. The method further includes storing the updated document in the virtual secured space allocated to the third-party application.

BRIEF DESCRIPTION OF THE FIGURES

For a more complete understanding of example embodiments of the present technology, reference is now made to the following descriptions taken in connection with the accompanying drawings in which.

Figure 1:
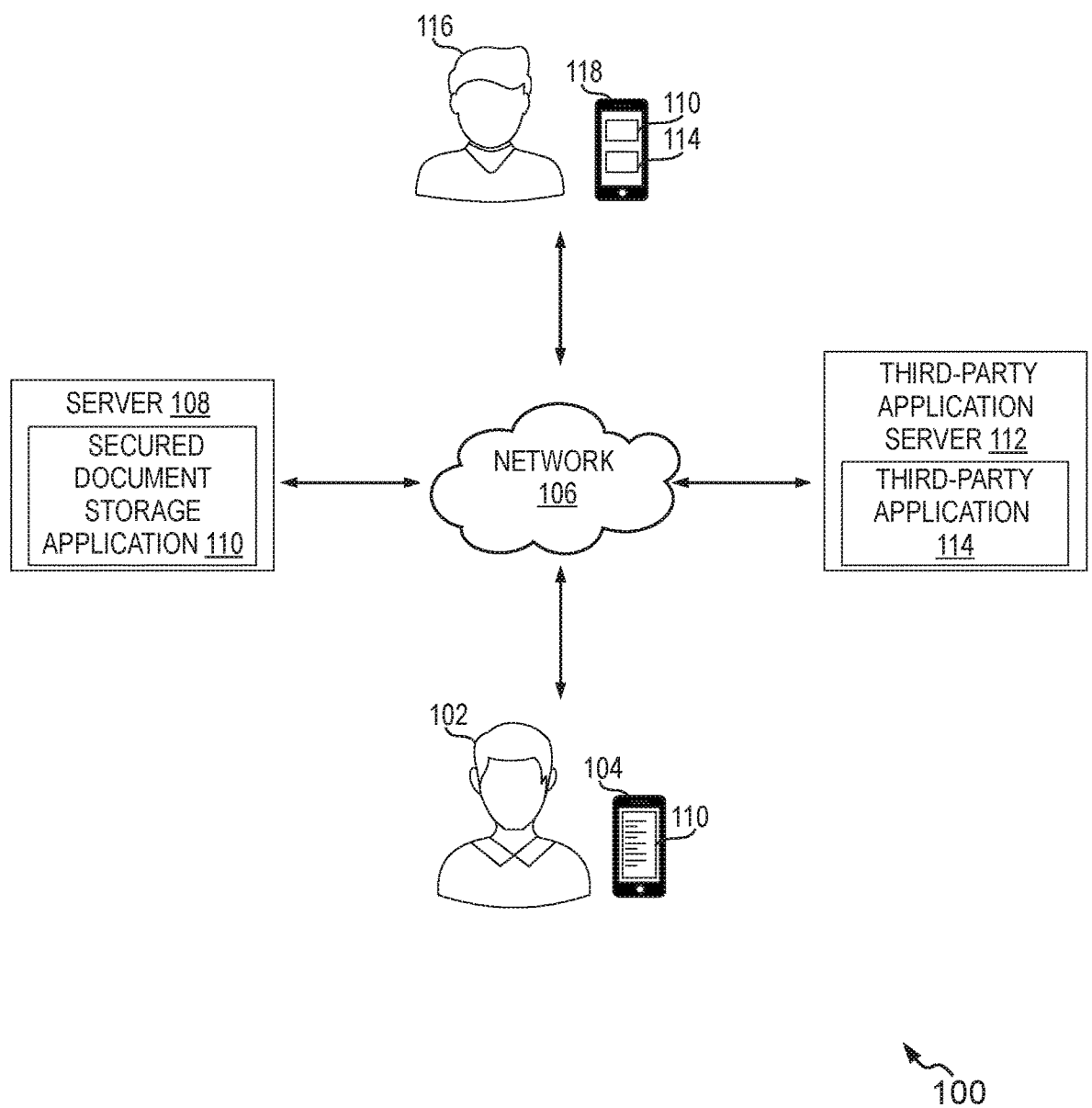
FIG. 1 is an illustration of an environment, where at least some example embodiments can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "third-party application" used throughout the description refers to a software application developed by a developer other than the manufacturer of a computing device or its operating system that the software application runs on. For example, an iPhone® comes with its own camera application, so the camera applications installed on the iPhone® other than its own camera application shall be considered as third-party applications for the iPhone®.

Overview

Various example embodiments of the present disclosure provide methods and systems for performing exchange of data with third-party applications.

A secured document storage application is provided for securely storing data and exchanging the data with trusted and/or non-trusted third-party applications. Herein, the 'data' can be considered as a collection of one or more documents. A third-party application may require a document for performing one or more document related operations on the document.

For performing the document related operations on the document, the third-party application may send a request to the secured document storage application. The secured document storage application, upon receiving the request, may check whether the third-party application is a trusted third-party application for the secured document storage application. In case of the non-trusted third-party application, the secured document storage application converts the non-trusted third-party application into a containerized application that runs in a containerized environment. The containerized environment has appropriately restricted secure computing resources to prevent the containerized application from exceeding limitations imposed on the containerized application. In case of the trusted third-party application, the secured document storage application determines whether the trusted third-party application is capable of recognizing a plurality of access rights granted to the trusted third-party application. Upon determining that the trusted third-party application is incapable of recognizing the plurality of access rights, the secured document storage application may create and apply a wrapper suite to the trusted third-party application. The wrapper suite embeds an editing window of the trusted third-party application into a frame where one or more operation restrictions, such as menu operation restrictions, keystroke restrictions etc., can be imposed.

In either case, the secured document storage application may allocate a virtual secured space to the containerized application/trusted third-party application and then perform decryption of the document as the document is in an encrypted form, to make the document a secured document. The secured document storage application may then perform encryption of the document with a public key of third-party application. The secured document storage application may then provide the document to the containerized application/trusted third-party application. The containerized application/trusted third-party application may use a private key to decrypt the document, and then a user of the containerized application/trusted third-party application can perform document related operations on the document to create an updated document based at least on one of the access rights, limitations and operation restrictions. Once the document related operations are done, the containerized application/trusted third-party application may re-encrypt the updated document using an encryption key that is created based on negotiation between the containerized application/trusted third-party application and the secured document storage application.

The updated document is then returned to the secured document storage application that decrypts the re-encrypted updated document and then stores the updated document in the virtual secured space allocated to the containerized application/trusted third-party application.

Various example embodiments of the present disclosure are described hereinafter with reference to FIGS. 1 to 10.

FIG. 1 is an illustration of an environment 100 related to at least some example embodiments of the present disclosure. The environment 100 includes, but is not limited to, a wireless communication network (e.g., a network 106) that connects entities such as users 102 and 116, a server 108 and a third-party application server 112. The users 102 and 116 are depicted to be associated with electronic devices 104 and 118 (hereinafter referred to as 'user device 104 and user device 118', respectively). The user devices 104 and 118 may be capable of being connected to the wireless communication network (such as the network 106). Examples of the user devices 104 and 118 include a mobile phone, a smart telephone, a computer, a laptop, a Personal Digital Assistant (PDA), a Mobile Internet Device (MID), a tablet computer, an Ultra-Mobile personal computer (UMPC), a phablet computer, a handheld personal computer and the like. It should be noted that two users are shown for the sake of simplicity; there can be a greater number of users.

In an embodiment, the user devices 104 and 118 are equipped with a secured document storage application 110 provided by the server 108. The server 108 may provide the secured document storage application 110, in response to a request received from the user devices 104 and 118 via the network 106. Examples of the network 106 include stand-alone or a combination of a local area network (LAN), a wide area network (WAN), wireless, wired, any currently existing or to be developed network that can be used for communication. More specifically, an example of the network 106 can be the Internet which may be a combination of a plurality of networks. In an embodiment, the secured document storage application 110 may be factory-installed on the user devices 104 and 118 and the users 102 and 116 may not need to specifically request the secured document storage application 110 from the server 108 that facilitates the secure exchange of secured data with (non) trusted third-party applications, such as a third-party application 114. The third-party application 114 can be an e-mail application, a document viewer or editor, a business application, etc. In another embodiment, the secured document storage application 110 may be accessed by the user devices 104 and 118 through web via the network 106. More specifically, the secured document storage application 110 may be accessed by the user devices 104 and 118 through the web via the Internet.

The secured document storage application 110 facilitates secure storage and sharing of one or more documents. The user devices 104 and 118 may be any communication devices having hardware components for enabling User Interfaces (UIs) of the secured document storage application 110 to be presented on the user devices 104 and 118.

The user 102 may access the secured document storage application 110 for storing a document. Examples of the document include, but are not limited to, design and architecture documents, financial reports of a company, health reports of a patient, bank statements of a person etc. The document can be any type of content, such as audio-visual media, word document, audio file, video file, Extensible Markup Language (XML) file etc. The user 102 may also access the secured document storage application 110 for sharing the document with other users, such as the user 116 once the document is available for sharing in the secured document storage application 110. In an example embodiment, the user 102 may be asked to provide an electronic mail (e-mail) id of the user 116 with whom the user 102 wants to share the document. The user 102 may also be asked to define one or more privileges/access rights that the user 102 wants to give to the user 116 while sharing the document with the user 116 using the secured document storage application 110. The one or more privileges/access rights that can be given to the other users by an owner of the document include, but are not limited to, reading of the document, sharing of the document, copy creation of the document, downloading of the document, updating of the document, printing of the of the document, deletion of the document etc.

In an embodiment, the user 116 may access the secured document storage application 110 for viewing the document shared by the user 102. In an example embodiment, the user 116 may be asked to first register with the secured document storage application 110 for viewing the shared document in case the user 116 is a non-registered user of the secured document storage application 110. It should be noted that the user 116 needs to register with the same email id of the user 116 that the user 102 has provided while sharing the document using the secured document storage application 110 in order to view the shared document. The user 116 can perform one or more document related operations, such as editing of the document, reading of the document, deletion of the document etc., on the document based on the privileges/access rights granted by the owner of the document i.e. the user 102. For example, if the access rights are limited to reading of the document, then the user 116 can only perform reading of the document using the secured document storage application 110.

In at least one example embodiment, the user device 118 is also equipped with the third-party application 114. The third-party application 114 is an application resting at the third-party application server 112. In an embodiment, the third-party application server 112 is configured to manage the third-party application 114 and communicate with devices, such as the user device 118 using the network 106. The third-party application 114 can also be accessed through web using Internet. The user 116 may access the third-party application 114 for performing at least one document related operation, such as editing on the document shared by the user 102.

In an embodiment, the secured document storage application 110 is configured to securely store one or more documents provided by a user (e.g., the user 102) of the secured document storage application 110. In an embodiment, the secured document storage application 110 may perform encryption of the documents for securing the documents before storing the documents into a database associated with the server 108. The secured document storage application 110 is also configured to facilitate secure sharing of each document with other users (e.g., the user 116). Further, the secured document storage application 110 is configured to facilitate the secure exchange of each document with a third-party application (e.g., the third-party application 114) for enabling the third-party application to perform at least one document related operation by the user on the document. The third-party application 114 can be a trusted third-party application or a non-trusted third-party application. In an embodiment, the trusted third-party application is the third-party application which has made a contractual agreement with the secured document storage application 110 to comply with privacy and security requirements of the secured document storage application 110. The non-trusted third-party application is the third-party application which has not made any contractual agreement with the secured document storage application 110 to comply with privacy and security requirements of the secured document storage application 110. The privacy and security requirements of the secured document storage application 110 may be defined in form of a plurality of access rights.

For facilitating the secure exchange of a document with the third-party application, the secured document storage application 110 is configured to first determine whether the third-party application is the trusted third-party application or the non-trusted third-party application. In case of the non-trusted third-party application, the secured document storage application 110 is configured to convert the third-party application into a containerized application using a containerization mechanism in which a non-modified version of the third-party application is taken and deployed in a container to generate the containerized application. The containerized application may then be configured to implement one or more limitations on the secured document based on the plurality of access rights provided to the third-party application by the secured document storage application 110. The one or more limitations may include forbidding one or more of printing of the document, downloading of the document, reading of the document, editing of the document, copying of the document, and deletion of the document.

In case of the trusted third-party application, the secured document storage application 110 is configured to determine whether the third-party application 114 is capable of recognizing the plurality of access rights granted to the third-party application by the secured document storage application 110. Upon determining that the third-party application 114 is incapable of recognizing the plurality of access rights, the secured document storage application 110 is configured to create and apply a wrapper suite to the third-party application 114. The wrapper suite may embed an editing window of the third-party application 114 into a frame where one or more operation restrictions can be imposed on the third-party application 114. The one or more operation restrictions may include disabling one or more of a print operation, a save operation, a copy operation, a paste operation, a download operation, and performing redaction of one or more sensitive contents included in the document. The one or more operation restrictions may be created based on the plurality of access rights granted to the third-party application 114 by the secured document storage application 110.

In either case, the secured document storage application 110 is configured to allocate a virtual secured space to the containerized application/third-party application. In an embodiment, the virtual secured space is an encrypted virtual space created on a hard disk of a user device (e.g., the user device 118) in which the secured document storage application 110 and the third-party application 114 are installed. The third-party application is either the trusted third-party application which is capable of recognizing the access rights or the trusted third-party application which is incapable of recognizing the access rights.

Further, the secured document storage application 110 is configured to decrypt the document as the document is an encrypted document. The secured document storage application 110 then encrypts the document i.e. the decrypted document using a public key of an asymmetric key pair of the containerized application/third-party application. The secured document storage application 110 is also configured to include the plurality of access rights of the containerized application/third-party application, and an encryption key in a header field of the encrypted document. The encryption key can be a public key or a shared key or a pre-negotiated key or a key generated based on negotiation between the containerized application/third-party application and the secured document storage application 110. The secured document storage application 110 is then configured to provide the encrypted document to the containerized application/third-party application that is configured to implement the one or more limitations/the one or more operation restrictions on the encrypted document before allowing any document related operation to be performed on the encrypted document. The encrypted document can be decrypted by the containerized application/third-party application using a private key of the asymmetric key pair of the containerized application/third-party application.

The secured document storage application 110 is further configured to facilitate in performing the at least one document related operation on the encrypted document to create an updated document based at least on the one or more limitations/the operation restrictions and the access rights. Once the document related operations are performed by a user (e.g., the user 116) of the containerized application/third-party application, the containerized application/third-party application may re-encrypt the updated document using the encryption key and may provide the updated document to the secured document storage application which then decrypts the updated document using the encryption key. The secured document storage application 110 is then configured to store the updated document in the virtual secured space allocated to the containerized application/third-party application.

Further, the secured document storage application 110 is configured to scan the documents stored in the virtual secured space allocated to the containerized application/third-party application to determine one or more sensitive portions of the documents. The secured document storage application 110 is also configured to encrypt the one or more sensitive portions of the documents using an encryption algorithm. The encryption of the one or more sensitive portions of the documents is performed either after detecting termination of the third-party application 114 on the user device in case of trusted third-party application, or before creating a copy of the one or more documents of the virtual secured space in a memory of the user device (e.g., the user device 118) in case of the containerized application. In an embodiment, the encryption algorithm can be any known encryption algorithm, such as data encryption standard (DES) algorithm, Rivest-Shamir-Adleman (RSA) algorithm, Blowfish etc.

Additionally, the secured document storage application 110 is configured to create and maintain a user profile for each user of a plurality of users of the secured document storage application 110. The secured document storage application 110 is also configured to authenticate access of each document of the one or more documents stored by each user i.e. only an authorized user of the document is allowed to perform any document related operation on the document.

In an example scenario, as shown in FIG. 1, the user 102 may want to securely store and share a document A. The user 102 may use the secured document storage application 110 installed on the user device 104 for uploading the document A. The document A can be uploaded from a local drive on the user device 104 or the user 102 may upload the document A to the secured document storage application 110 from a cloud drive. Once the document A is uploaded by the user 102, the secured document storage application 110 may perform encryption of the document A before storing the document A in the database associated with the server 108. After successful storage of the document A in the database, the secured document storage application 110 may display the document A in the user profile maintained for the user 102 from where the user 102 can share the document A with other users, such as the user 116. The user 102 may be required to provide an email-id of the user 116 for sharing the document with the user 116. The email-ID may be used by the server 108 for authorizing the user 116 in order to authenticate access of the document A to the user 116.

In a non-limiting example, once the user 102 shares the document A with the user 116, the user 116 may receive an e-mail notification informing the user 116 about the document A shared by the user 102. The user 116 can click on a link included in the email to view the shared document A. Clicking on the link may redirect the user 116 to the secured document storage application 110 from where the user 116 can view the document A if the user 116 is already a registered user of the secured document storage application 110. In case, the user 116 is a non-registered user, the user 116 may be asked to first perform registration on the secured document storage application 110 for viewing the document A. Once the registration is done, the user 116 can view the document A in a user profile maintained for the user 116.

The user 116 can perform one or more operations on the document based on access rights provided by the user 102. If the user 102 has allowed the user 116 to perform modifications in the document A, the user 116 will be able to do the modifications on the document A.

The user 116 may want to edit (an example of a document related operation) the document A in a way that is not supported by the secured document storage application 110. The user 116 may then want to use the third-party application 114 installed on the user device 118 for performing editing of the document A as the secured document storage application 110 facilitates sharing of the secured documents with third-party applications. In a non-limiting example, while viewing the document A in the secured document storage application 110, the user 116 may get an 'open with' option (not shown) for opening the document with any document supported applications that are available on the user device 118. The user 116 may then use a corresponding option to open the document A with the third-party application 114. Once the user selects the third-party application 114, the third-party application 114 may send a request to the secured document storage application 110 for performing at least one document related operation on the document A. The request may include user details, such as an e-mail id of the user 116 and a name of the user 116.

Upon receiving the request, the secured document storage application 110 is configured to perform authentication of the request by checking whether the user 116 is an authorized user. The secured document storage application 110 may maintain a sharing path for each stored document where user details of each user with whom the corresponding document is being shared are maintained. The secured document storage application 110 may check the sharing path maintained for the document A to perform authentication of the user 116. Once the authentication is successful, the secured document storage application 110 may determine whether the third-party application 114 is the trusted third-party application or the non-trusted third-party application. The steps performed in case of non-trusted third-party application and in case of the trusted third-party application which is incapable of recognizing the plurality of access rights are explained above, therefore for the sake of brevity, the steps herein are not explained again in detail.

The secured document storage application 110 may allocate a virtual secured space to the third-party application 114 and then perform encryption of the document A with a public key of third-party application 114. The secured document storage application 110 may then provide the encrypted document A to the third-party application 114. The third-party application 114 may use a private key to decrypt the encrypted document A and then the user 116 can perform document related operations on the document A based at least on one of the access rights, one or more limitations and one or more operation restrictions. For example, if the access rights forbid downloading of the document A, then the user 116 is not allowed to download the document A.

Further, the secured document storage application 110 may keep tracking location of the user device 118 using a device tracking mechanism during the use of the third-party application 114 by the user 116 to perform document related operation on the document A. The secured document storage application 110 may then check whether the location of the user device 118 is an authorized location. In an embodiment, authorized locations and unauthorized locations are pre-defined by an administrator of the secured document storage application 110. In case of the authorized location, the user 116 may keep using the third-party application 114 for performing document related operation on the document A, and in case of the unauthorized location, the secured document storage application 110 may halt the access of the document A to the third-party application 114.

Once the user 116 is done performing the document related operations on the document A, the third-party application 114 may re-encrypt updated document A using the encryption key before sending the updated document A back to the secured document storage application 110. Upon receiving the updated document A, the secured document storage application 110 may decrypt the updated document A using the same encryption key and may store the updated document A in the virtual secured space allocated to the third-party application 114 on the user device 118.

Figure 10:
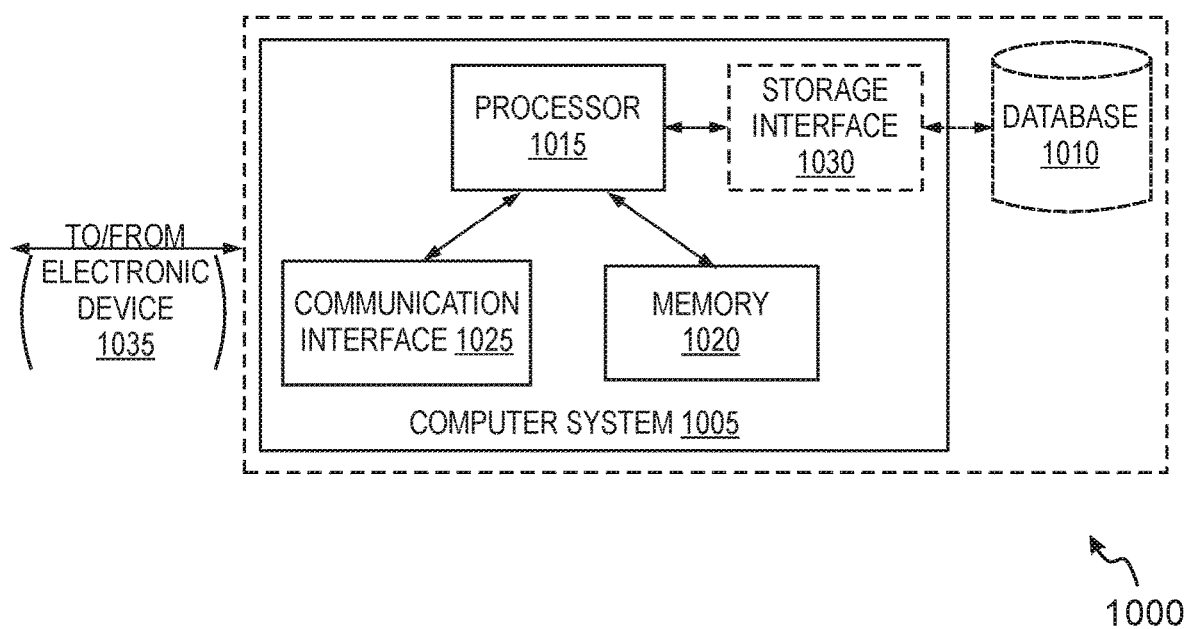
FIG. 10 is a block diagram of a server system, in accordance with an example embodiment of the present disclosure.

It is noted that the instructions (or the executable code) configuring the secured document storage application 110 are stored in a memory of the server 108 and the instructions are executed by a processor (for example, a single-core or a multi-core processor) included within the server 108, as is exemplarily shown with reference to FIG. 10. Similarly, instructions (or the executable code) configuring the third-party application 114 are stored in a memory of the third-party application server 112 and the instructions are executed by a processor included within the third-party application server 112. Accordingly, even though the various functionalities for performing the secure exchange of secured data with (non) trusted third-party applications are explained with reference to or being performed by the secured document storage application 110, it is understood that the processor in conjunction with the code in the memory is configured to execute the various tasks as enabled by the instructions of the secured document storage application 110 facilitated by the server 108.

The various components of the secured document storage application 110 are further explained with reference to FIG. 2.

Figure 2:
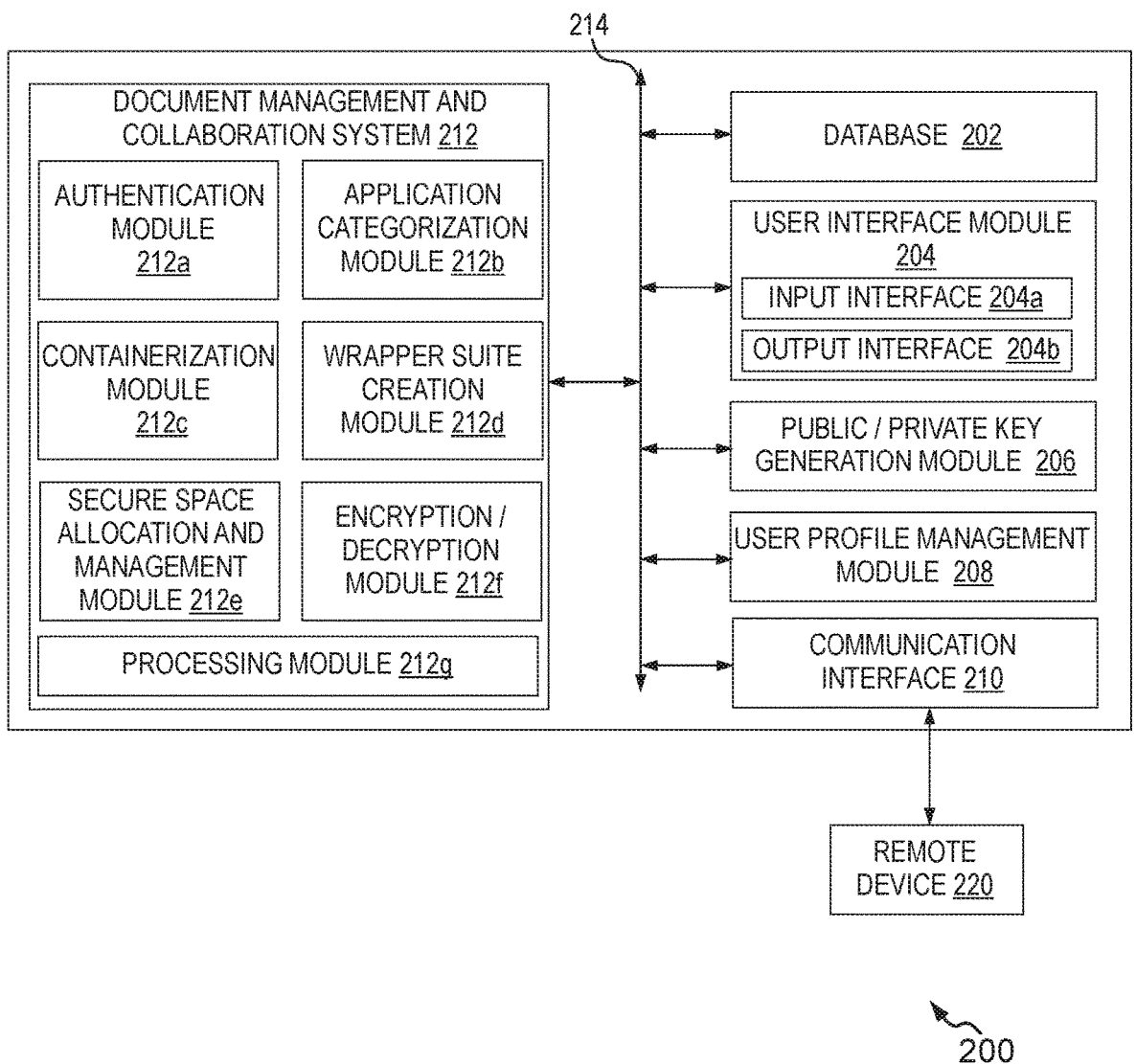
FIG. 2 is a block diagram of a system for performing exchange of data with (non) trusted third-party applications, in accordance with an example embodiment.

FIG. 2 is a block diagram of a system 200 for performing exchange of data with (non) trusted third-party applications, in accordance with an example embodiment. The system 200 may be embodied in a server, such as the server 108 providing the secured document storage application 110 or electronic devices, such as, the user devices 104 and 118 in which the secured document storage application 110 is installed. The system 200 is configured to ensure sharing of a document with third-party applications, such as the third-party application 114 either by converting a non-trusted third-party application into a containerized application where access constraints can be put to eliminate those effects which exceed the desired access limitations of the document or by applying a wrapper suite to the trusted third-party application which is incapable of recognizing the plurality of access rights of the trusted third-party application. In an embodiment, the system 200 includes a database 202, a user interface (UI) module 204, a public/private key generation module 206, a user profile management module 208, a communication interface 210, a document management and collaboration system (DMCS) 212, and a centralized circuit system 214.

The database 202 is configured to store one or more documents received from one or more users (e.g., the users 102 and 116). The database 202 is also configured to store access rights and a sharing path associated with each document of the one or more documents. Further, the database 202 is configured to store user details associated with each user of the one or more users. The user details include, but are not limited to, email-id of the user and name of the user.

The UI module 204 is in communication with the database 202. The UI module 204 is configured to present one or more UIs for facilitating secured exchange of secured data. The UI module 204 includes an input interface 204a and an output interface 204b. The input interface 204a is configured to receive one or more documents that are to be securely stored. The input interface 204a is also configured to receive user details associated with each user. Further, the input interface 204a is also configured to receive requests for accessing one or more stored documents from one or more users (e.g., the users 102 and 116) of the system 200. Additionally, the input interface 204a is configured to receive a sharing request from the user to share the stored document with other users. Examples of the input interface 204a may include, but are not limited to, a keyboard, a mouse, a joystick, a keypad, a touch screen, soft keys, a floppy disk, a pen drive, a hard drive and the like. In an embodiment, the output interface 204b is configured to display one or more documents to the users of the system 200. The output interface 204b is also configured to facilitate sharing of the one or more documents by the users of the system 200. Examples of the output interface 204b may include, but are not limited to, a display such as a light emitting diode (LED) display, a thin-film transistor (TFT) display, a liquid crystal display, an active-matrix organic light-emitting diode (AMOLED) display, and the like.

The public/private key generation module 206 is configured to generate public and private keys for performing encryption of the documents that are to be securely stored. The user profile management module 208 is in communication with the database 202. The user profile management module 208 is configured to generate and manage user profile of each user of the system 200. The management of the user profile includes management of the documents stored by the user, management of the documents shared with the user and management of the settings of the user profile set by the user.

The communication interface 210 is configured to enable communication with a remote device 220, such as the user device 104 and the user device 118 by exchanging requests, responses, notifications, location information and other messages.

The DMCS 212 is in communication with the database 202, the UI module 204, the public/private key generation module 206, the user profile management module 208 and the communication interface 210. The DMCS 212 is configured to enable the secure exchange of secured data with trusted/non-trusted third-party applications via the secured document storage application 110. The DMCS 212 includes an authentication module 212a, an application categorization module 212b, a containerization module 212c, a wrapper suite creation module 212d, a secure space allocation and management module 212e, an encryption/decryption module 212f, and a processing module 212g.

The authentication module 212a is configured to authenticate a request received from the remote device 220 for performing at least one document related operation on a document. In an embodiment, the request may be sent by a third-party application installed/accessed from the remote device 220. The request may include user details of the user who wants to perform the document related operation using the third-party application. For performing authentication, the authentication module 212a may check whether the user is an authorized user of the document either by matching the user details included in the request with the user details of an owner of the document or by matching the user details of one or more users included in the sharing path associated with the document as fetched from the database 202. Upon determining a match, the user is considered as an authorized user of the document.

The application categorization module 212b is configured to categorize the third-party application from which the request is received as a trusted third-party application or a non-trusted third-party application based on contractual and standard agreements that are signed between the applications i.e. the third-party application and the secured document storage application 110. In case of the trusted third-party application, the application categorization module 212b is also configured to check whether the third-party application is capable of recognizing a plurality of access rights granted to the third-party application by the secured document storage application 110. The information determined by the application categorization module 212b is communicated to the processing module 212g.

The containerization module 212c is configured to convert the third-party application into a containerized application in case the third-party application is categorized as the non-trusted third-party application. The containerization module 212c may use a containerization mechanism in which an unmodified version of the third-party application may be received by the containerization module 212c and then the containerization module 212c deploys the unmodified version of the third-party application in a container to generate the containerized application. The containerized application is an application that is encapsulated in the container with its own operating environment and is configured to implement one or more limitations on the document corresponding to a plurality of access rights received from the secured document storage application 110 along with the document.

The wrapper suite creation module 212d is configured to create a wrapper suite for the third-party application in case the third-party application is the trusted third-party application which is incapable of recognizing a plurality of access rights granted to the third-party application. The wrapper suite creation module 212d is also configured to apply the wrapper suite to the third-party application by embedding an editing window of the third-party application into a frame where the one or more operation restrictions can be imposed on the third-party application.

The secure space allocation and management module 212e is configured to allocate virtual secured space to the third-party application where the documents can be stored. The secure space allocation and management module 212e is also configured to perform scanning of the one or more documents stored in the virtual secured space to determine one or more sensitive portions of the documents. Further, the secure space allocation and management module 212e is configured to encrypt the one or more sensitive portions of the documents either after detecting the termination of the trusted third-party application on the remote device 220 or before creating a copy of the documents of the virtual secured space allocated to the containerized application in a memory of the remote device 220. Additionally, the secure space allocation and management module 212e is configured to delete the virtual secured space allocated to the third-party application upon detecting termination of the third-party application on the remote device 220.

The encryption/decryption module 212f is configured to perform encryption and decryption of the one or more documents that are to be securely stored or are already securely stored for facilitating secured sharing of the one or more documents with the third-party application. The encryption and decryption of the one or more documents may be performed either by using the public/private keys generated by the public/private key generation module or by using an asymmetric key pair of the third-party application.

The processing module 212g is in communication with the database 202, the UI module 204, the public/private key generation module 206, the user profile management module 208, the communication interface 210 and the modules 212a to 212f of the DMCS 212. The processing module 212g is configured to send operating instructions to the database 202, the UI module 204, the public/private key generation module 206, the user profile management module 208, the communication interface 210 and the modules 212a to 212f of the DMCS 212 for facilitating access and exchange of secured data stored in the system 200 with trusted/non-trusted third-party applications. The processing module 212g is configured to provide the document to the third-party application. Further, the processing module 212g is configured to facilitate in performing at least one document related operation on the document based on access rights of the third-party application. Additionally, the processing module 212g is configured to track location of the remote device 220 during the use of the third-party application for performing the document related operation on the document using a device tracking mechanism. The processing module 212g is configured to halt the access of the document to the third-party application upon determining that the location of the remote device 220 is an unauthorized location.

The database 202, the UI module 204, the public/private key generation module 206, the user profile management module 208, the communication interface 210 and the DMCS 212 may be configured to communicate with each other via or through the centralized circuit system 214. The centralized circuit system 214 may be various devices configured to, among other things, provide or enable communication among the modules (202-212) of the system 200. In certain embodiments, the centralized circuit system 214 may be a central printed circuit board (PCB) such as a motherboard, a main board, a system board, or a logic board. The centralized circuit system 214 may also, or alternatively, include other printed circuit assemblies (PCAs) or communication channel media. In some embodiments, the centralized circuit system 214 may include appropriate storage interfaces to facilitate communication among the modules (202-212). Some examples of the storage interface may include, for example, an Advanced Technology Attachment (ATA) adapter, a Serial ATA (SATA) adapter, a Small Computer System Interface (SCSI) adapter, a RAID controller, a SAN adapter or a network adapter.

Figure 3:
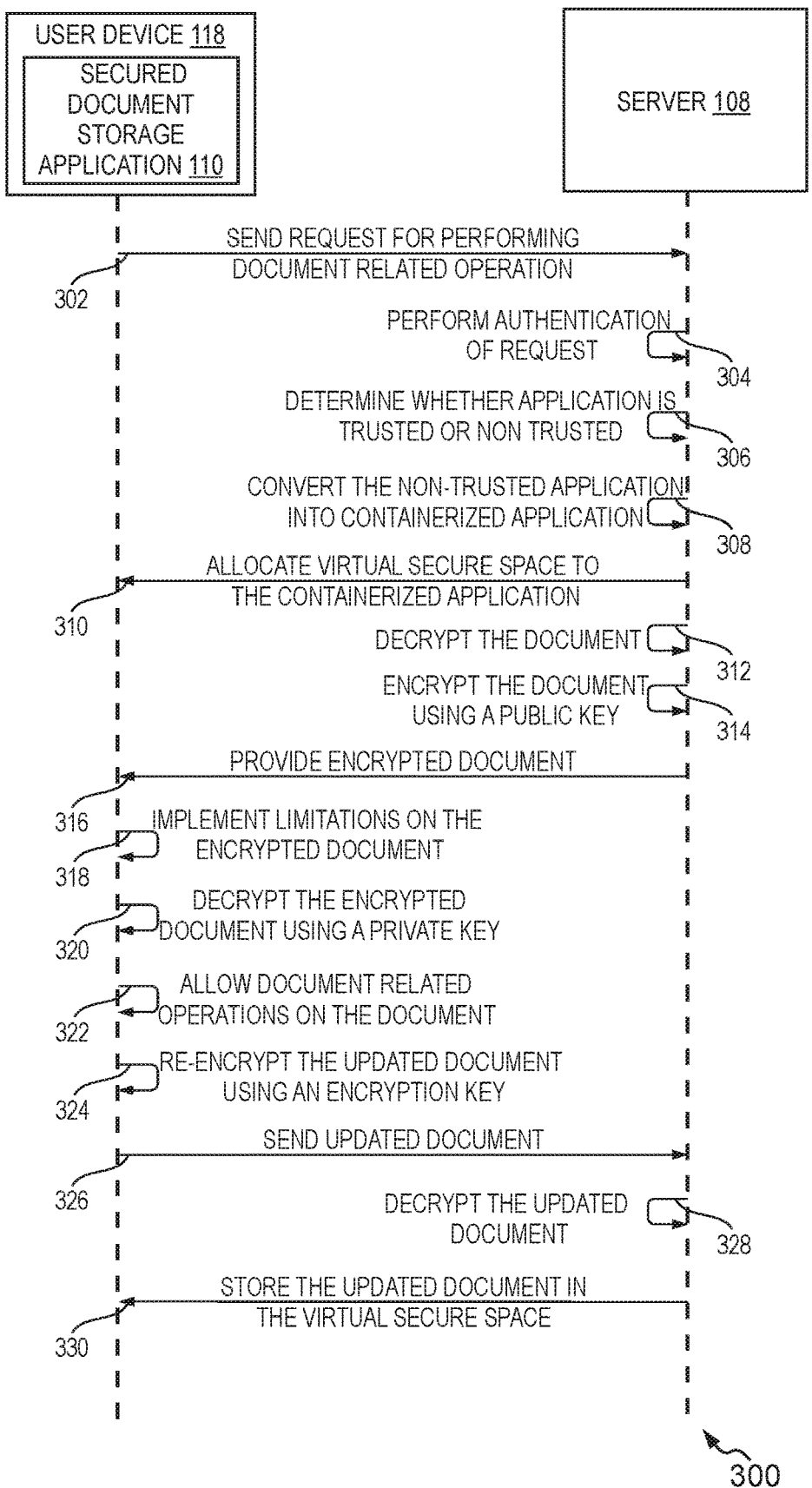
FIG. 3 is a sequence flow diagram for facilitating exchange of a document with a non-trusted third-party application, in accordance with an example embodiment.

FIG. 3 is a sequence flow diagram 300 for facilitating exchange of a document with a non-trusted third-party application, in accordance with an example embodiment. The steps of the sequence flow diagram 300 are performed when the user 116 wishes to perform at least one document related operation on the document using the third-party application 114 running on the user device 118. The third-party application 114 is the non-trusted third-party application and the document stored by the secured document storage application 110 is also present on the user device 118. The steps of the sequence flow diagram 300 may not to be necessarily executed in the same order as they are presented. Further, one or more steps may be grouped together and performed in form of a single step, or one step may have several sub-steps that may be performed in parallel or in sequential manner.

At 302, a third-party application (e.g., the third-party application 114) installed on a user device (e.g., the user device 118) sends a request to the server 108 providing the secured document storage application 110 installed on the same user device 118 to perform at least one document related operation on a document stored by the secured document storage application 110. The request may include user details, such as e-mail id, name etc., of a user (e.g., the user 116) of the non-trusted third-party application 114.

At 304, upon receiving the request, the secured document storage application 110 performs authentication of the request by checking whether the user 116 is an authorized user of the document for which the request is received. The secured document storage application 110 may contact the server 108 for performing the authentication of the request. The secured document storage application 110 may match the user details included in the request with user details of an owner of the document and user details of users included in a sharing path maintained for the document to see whether there is a match between the user details. Upon determining a match, the user 116 is considered as the authorized user, otherwise a non-authorized user. In case, the user 116 is found to be the authorized user of the document, step 306 is performed, else the request is declined by the secured document storage application 110.

At 306, the secured document storage application 110 determines whether the third-party application 114 from which the request is received is a trusted or a non-trusted third-party application. The secured document storage application 110 may contact the server 108 for performing the application categorization. The process of application categorization is already explained with reference to FIG. 1 and FIG. 2. As the third-party application 114 is the non-trusted third-party application, the step 308 is performed.

At 308, the secured document storage application 110 contacts the server 108 to convert the non-trusted third-party application into a containerized application. The containerized application is configured using a containerization mechanism that limits execution of the containerized application in a container or a sandbox, on the user device 118. The containerized application executes in a container environment that is isolated from other applications present on the user device 118.

At 310, the secured document storage application 110 allocates a virtual secured space to the containerized application. At 312, the secured document storage application 110 decrypts the document as the document is stored in an encrypted form. At 314, the secured document storage application 110 encrypts the document using a public key of an asymmetric key pair of the containerized application. In an embodiment, a preference of the asymmetric key pair that is to be used for encryption may be provided by the non-trusted third-party application while sending the request. The secured document storage application 110 may contact the server 108 for performing allocation of virtual secured space, decryption and encryption of the document.

At 316, the secured document storage application 110 provides the encrypted document to the containerized application. The encrypted document may include an encryption key and a plurality of access rights of the containerized application in a header field of the encrypted document. In an embodiment, the encryption key is to be used by the containerized application for encrypting the document prior to returning the document to the secured document storage application 110. The header field may also include one or more parameters for bounding the actions of the container in which the non-trusted third-party application will be executed. The parameters ensure the execution of the non-trusted third-party application in the container and forbid any change made by the non-trusted third-party application outside the container.

At 318, the containerization application implements the needed one or more limitations corresponding to the access rights that are provided to the containerization application. For example, if the restricted rights forbid printing of the document, printers will be removed and network access which could install a new printer will also be removed from the container environment.

At 320, the containerization application decrypts the encrypted document using a private key of the asymmetric key pair of the containerized application. At 322, the containerization application allows the user 116 to perform the document related operations on the received document that creates an updated document. In an embodiment, document related operations can be reading the document, editing the content included in the document, changing the format of the document etc.

At 324, the containerization application re-encrypts the updated document using the encryption key included in the header field of the document, once the user is done with performing document related operations on the document. At 326, the containerization application sends the updated document to the secured document storage application 110. At 328, the secured document storage application 110 decrypts the updated document using the same encryption key.

At 330, the secured document storage application 110 stores the updated document in the virtual secured space allocated to the containerized application. The storing of the updated document in the virtual secured space helps in ensuring that the updated document is not available outside the container. The secured document storage application 110 may delete the virtual secured space allocated to the containerized application upon detecting termination of the containerized application on the user device 118 or may encrypt the one or more sensitive portions of the updated documents in the virtual secured space before creating a copy of the documents of the virtual secured space in a memory of the user device 118, thereby ensuring the secure exchange of the document with the non-trusted third-party application.

Figure 4:
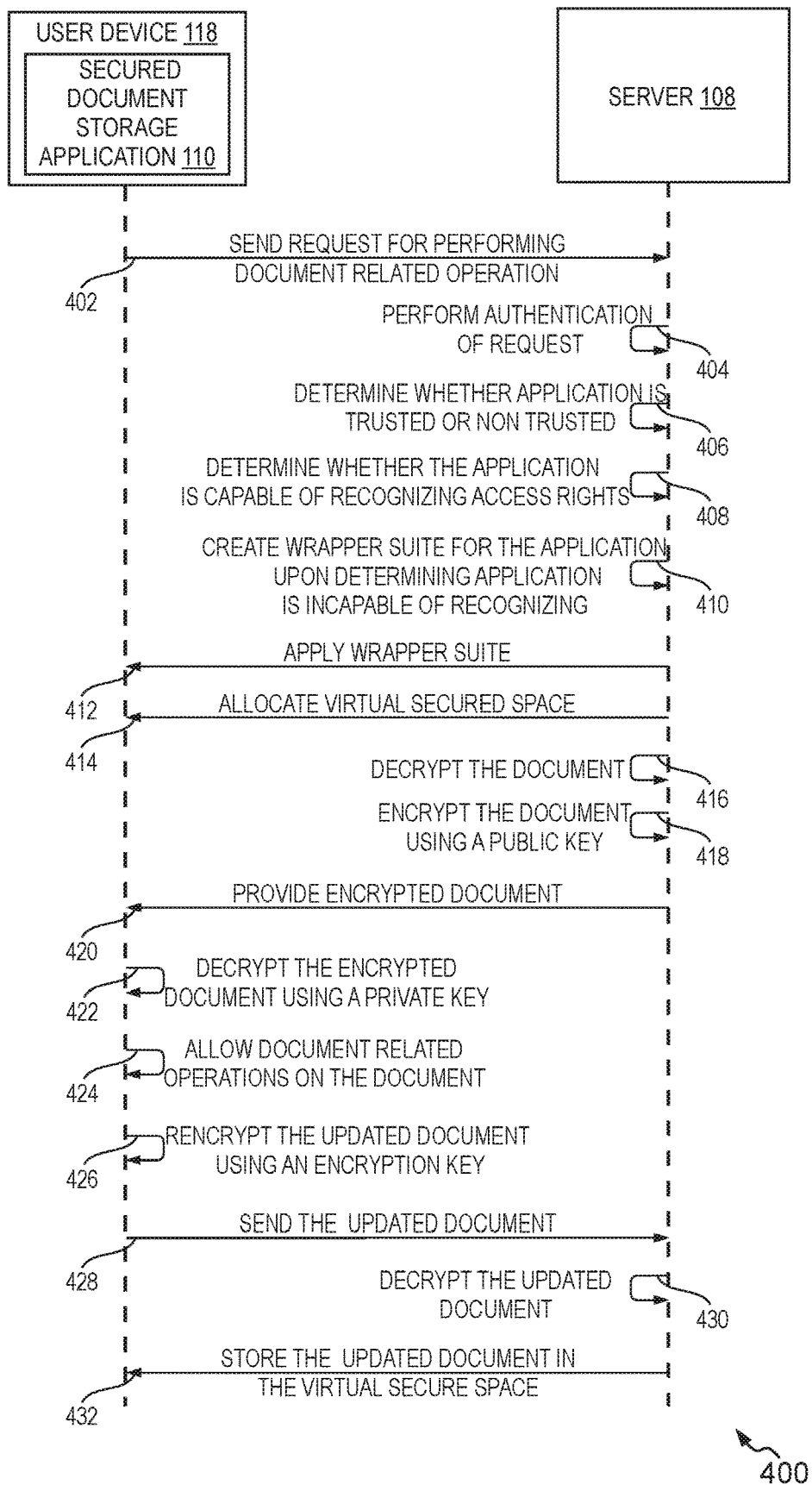
FIG. 4 is a sequence flow diagram for facilitating exchange of the document with a trusted third-party application, in accordance with an example embodiment.

FIG. 4 is a sequence flow diagram 400 for facilitating exchange of a document with a trusted third-party application, in accordance with an example embodiment. The steps of the sequence flow diagram 400 are performed when the third-party application 114 which is a trusted third-party application is found to be incapable of recognizing the plurality of access rights granted to the trusted third-party application by the secured document storage application 110. The steps of the sequence flow diagram 400 may not to be necessarily executed in the same order as they are presented. Further, one or more steps may be grouped together and performed in form of a single step, or one step may have several sub-steps that may be performed in parallel or in sequential manner.

At 402, a third-party application (e.g., the third-party application 114) installed on a user device (e.g., the user device 118) sends a request to a secured document storage application 110 installed on the same user device 118 to perform at least one document related operation on a document secured by the secured document storage application 110. The secured document storage application 110 may send the request to the server 108 providing the secured document storage application 110.

At 404, upon receiving the request, the secured document storage application 110 performs authentication of the request by checking whether the user 116 is an authorized user of the document for which the request is received. In case, the user 116 is found to be the authorized user of the document, step 406 is performed, else the request is declined by the secured document storage application 110.

At 406, the secured document storage application 110 determines whether the third-party application 114 from which the request is received is a trusted or a non-trusted third-party application. In case, the third-party application 114 is the trusted third-party application 114, the step 408 is performed. At 408, the secured document storage application 110 determines whether the trusted third-party application is capable of recognizing a plurality of access rights that are granted to the trusted third-party application 114. In case, the trusted third-party application is found to be incapable of recognizing the plurality of access rights, step 410 is performed. The secured document storage application 110 may request the server 108 for performing the steps 406 and 408.

At 410, the secured document storage application 110 creates a wrapper suite for the trusted third-party application. At 412, the secured document storage application 110 applies the wrapper suite to the trusted third-party application. The wrapper suite embeds an editing window of the trusted third-party application into a frame where one or more operation restrictions can be applied on the trusted third-party application. The operation restrictions are created based on the plurality of access rights given to the trusted third-party application. The operation restrictions may include menu item restrictions or keystroke restrictions etc. For example, if the access rights do not permit creation of copies of the document, then the document may not have a UI for invoking 'Save As', thereby ensuring that unencrypted copies of the document are not created. The secured document storage application 110 may request the server 108 for performing the steps 410 and 412.

At 414, the secured document storage application 110 allocates a virtual secured space to the trusted third-party application. At 416, the secured document storage application 110 decrypts the document as the document is stored in an encrypted form. At 418, the secured document storage application 110 encrypts the document using a public key of an asymmetric key pair of the trusted third-party application. The secured document storage application 110 may request the server 108 to perform the steps 414, 416 and 418.

At 420, the secured document storage application 110 provides the encrypted document to the trusted third-party application. The encrypted document includes an encryption key in a header field of the document. At 422, the trusted third-party application decrypts the encrypted document using a private key of the asymmetric key pair of the trusted third-party application 114. At 424, the trusted third-party application allows the user 116 to perform the document related operations on the document to create an updated document.

At 426, the trusted third-party application re-encrypts the updated document using the encryption key included in the header field of the document, once the user 116 is done performing document related operations on the document. At 428, the trusted third-party application sends the updated document to the secured document storage application 110. At 430, the secured document storage application 110 decrypts the updated document using the same encryption key.

At 432, the secured document storage application 110 stores the updated document in the virtual secured space allocated to the trusted third-party application. The secured document storage application 110 may encrypt the one or more sensitive portions of the documents in the virtual secured space after detecting termination of the trusted third-party application on the user device 118, thereby ensuring the secure exchange of the document with the trusted third-party application 114 which is unable to recognize the plurality of access rights given to the trusted third-party application by the secured document storage application 110. The secured document storage application 110 may request the server 108 to perform the steps 420, and 432.

Figure 5:
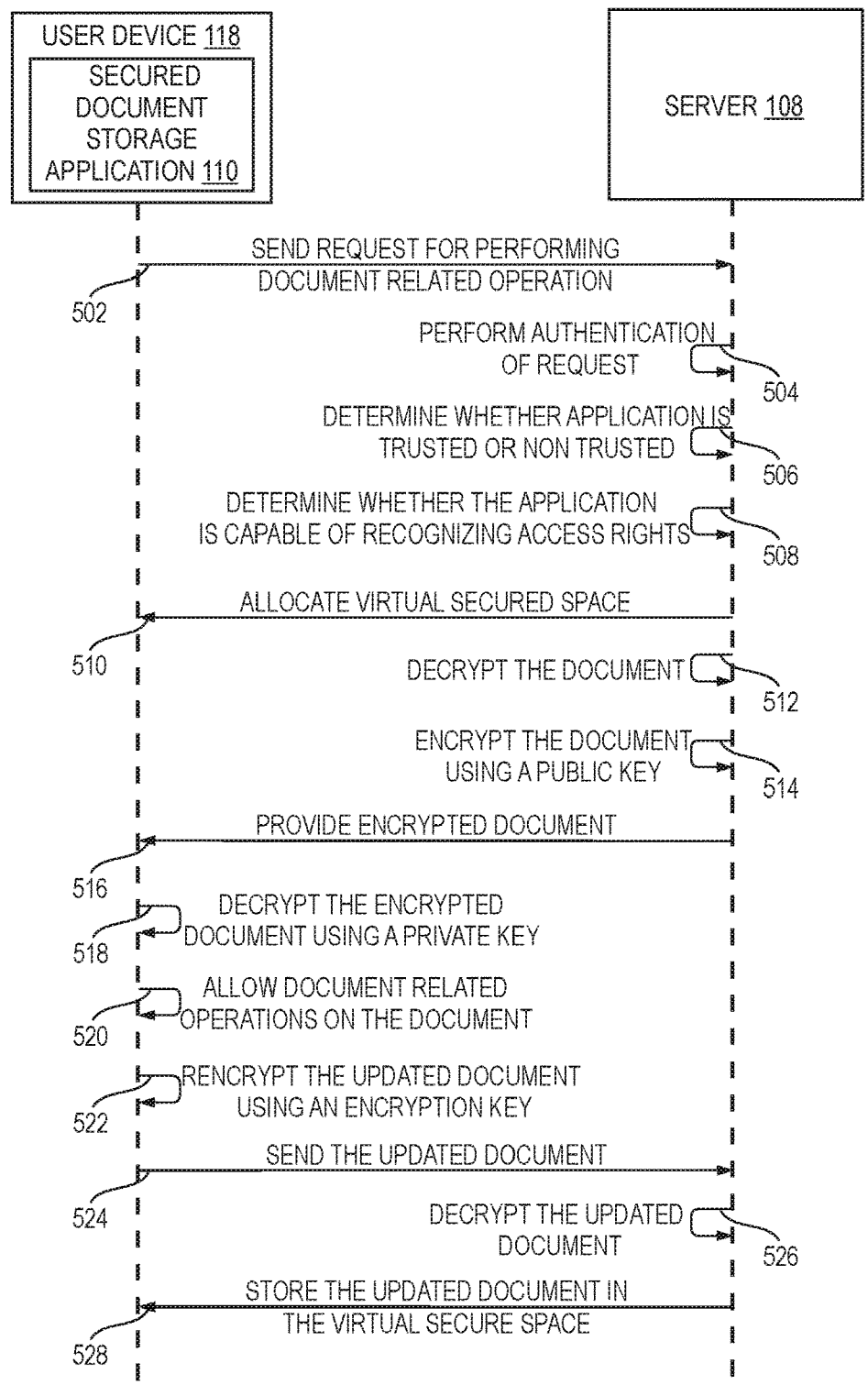
FIG. 5 is a sequence flow diagram for facilitating exchange of the document with the trusted third-party application, in accordance with another example embodiment.

FIG. 5 is a sequence flow diagram 500 for facilitating exchange of a document with a trusted third-party application, in accordance with another example embodiment. The steps of the sequence flow diagram 500 are performed when the third-party application 114 which is a trusted third-party application is found to be capable of recognizing the plurality of access rights granted to the trusted third-party application by the secured document storage application 110. The steps of the sequence flow diagram 500 may not to be necessarily executed in the same order as they are presented. Further, one or more steps may be grouped together and performed in form of a single step, or one step may have several sub-steps that may be performed in parallel or in sequential manner.

At 502, a third-party application (e.g., the third-party application 114) installed on a user device (e.g., the user device 118) sends a request to a secured document storage application 110 installed on the same user device 118 to perform at least one document related operation on a document secured by the secured document storage application 110. The secured document storage application 110 may send a request to the server 108.

At 504, upon receiving the request, the secured document storage application 110 performs authentication of the request by checking whether the user 116 is an authorized user of the document for which the request is received. In case, the user 116 is found to be the authorized user of the document, step 506 is performed, else the request is declined by the secured document storage application 110.

At 506, the secured document storage application 110 determines whether the third-party application 114 from which the request is received is a trusted or a non-trusted third-party application. As the third-party application 114 is the trusted third-party application, the step 508 is performed. At 508, the secured document storage application 110 determines whether the trusted third-party application is capable of recognizing a plurality of access rights that are granted to the third-party application 114. In case the third-party application 114 is found to be capable of recognizing the plurality of access rights, step 510 is performed. The secured document storage application 110 may request the server 108 to perform the steps 504, 506 and 508.

At 510, the secured document storage application 110 allocates a virtual secured space to the trusted third-party application. At 512, the secured document storage application 110 decrypts the document as the document is stored in an encrypted form. At 514, the secured document storage application 110 encrypts the document using a public key of an asymmetric key pair of the trusted third-party application. The secured document storage application 110 may request the server 108 to perform the steps 510, 512 and 514.

At 516, the secured document storage application 110 provides the encrypted document to the trusted third-party application. The encrypted document includes an encryption key in a header field of the document. At 518, the trusted third-party application decrypts the encrypted document using a private key of the asymmetric key pair of the trusted third-party application. At 520, the trusted third-party application allows the user 116 to perform the document related operations on the received document to create an updated document based on the plurality of access rights of the trusted third-party application.

At 522, the trusted third-party application re-encrypts the updated document using the encryption key included in the header field of the document, once the user 116 is done performing document related operations on the received document. At 524, the trusted third-party application sends the updated document to the secured document storage application 110. At 526, the secured document storage application 110 decrypts the updated document using the same encryption key. The secured document storage application 110 may request the server 108 to perform the steps 516, and 526.

At 528, the secured document storage application 110 stores the updated document in the virtual secured space allocated to the trusted third-party application 114. In an embodiment, the virtual secured space may be an encrypted virtual hard disk space on the user device 118. The secured document storage application 110 may encrypt the one or more sensitive portions of the documents in the virtual secured space after detecting termination of the trusted third-party application on the user device 118, thereby ensuring the secure exchange of the secured document with the trusted third-party application.

Figure 6:
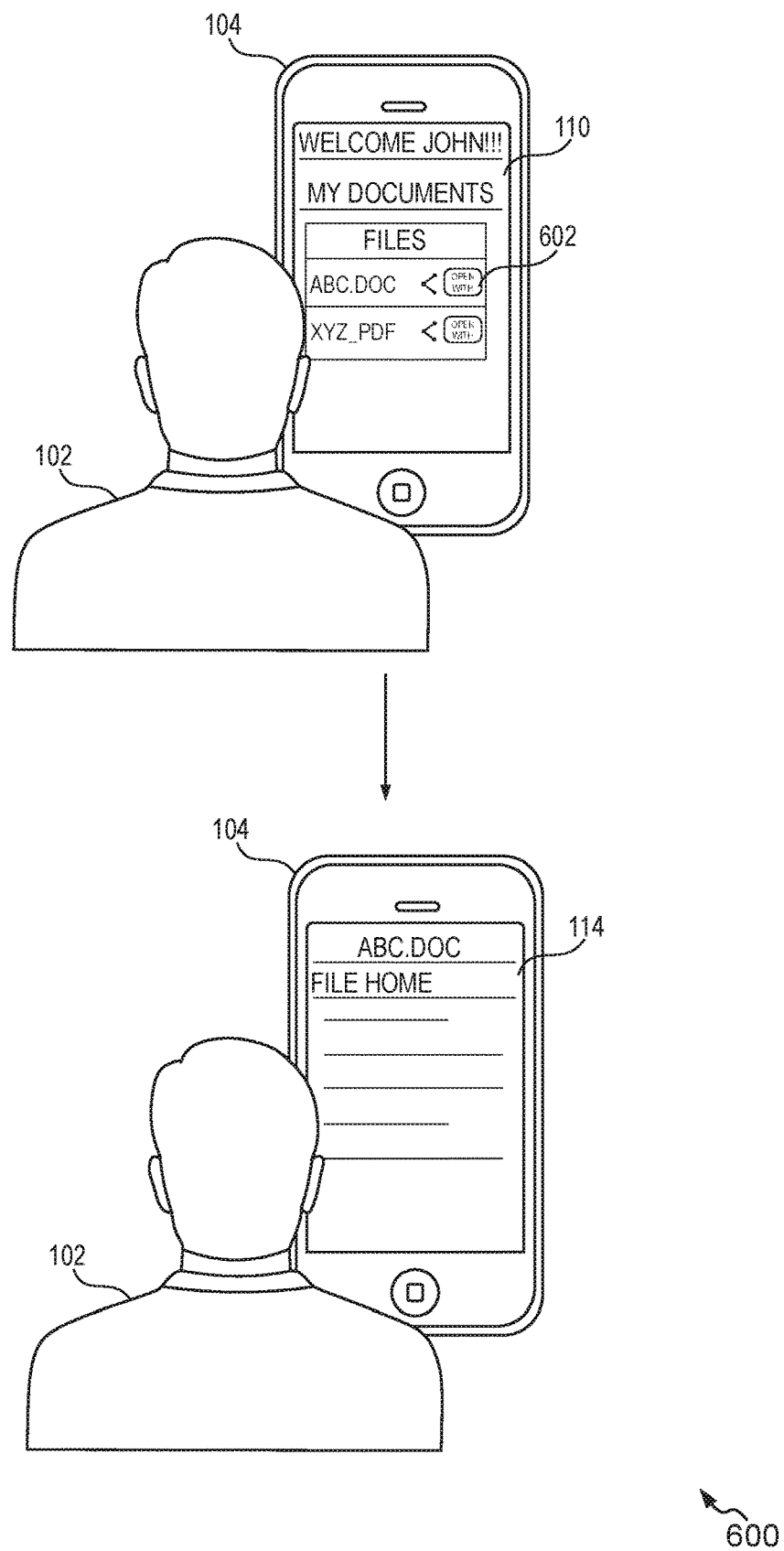
FIG. 6 illustrates an exemplary scenario of performing at least one document related operation on a document by a user using a third-party application, in accordance with an example embodiment.

FIG. 6 illustrates an exemplary scenario 600 of performing at least one document related operation on a document by a user using a third-party application (e.g., the third-party application 114), in accordance with an example embodiment of the present disclosure. The scenario is performed by the user (e.g., the user 102) who has stored the document himself and wants to perform at least one document related operation on the document using the third-party application 114. The user may be accessing both the applications i.e. secured document storage application 110 used for storage of the document and the third-party application 114 from a user device (e.g., the user device 104).

As shown in FIG. 6, the user 102 is viewing a user profile maintained by the secured document storage application 110 for the user 102 on the user device 104. The user profile displays a list of documents, such as 'ABC.DOC' and 'XYZ.PDF' that are securely stored by the user 102 using the secured document storage application 110. The user 102 further wants to edit the document named 'ABC.DOC' using the third-party application 114. Therefore, for editing the document, the user may click on an 'open with' tab/clickable icon 602 provided along the document 'ABC.DOC'. Clicking on the tab 602 may provide options of one or more applications including the third-party application 114 that can be used by the user to perform editing of the document. The user may choose the third-party application 114 from the available one or more applications.

As soon as the user 102 selects the third-party application 114, the third-party application 114 sends a request to the secured document storage application 110 for performing at least one document related operation (i.e., editing) on the document 'ABC.DOC'. It should be noted that the user 102 needs to have a profile with same name on the third-party application 114 for using the third-party application 114 for performing the document related operation on the document ABC.DOC'. The secured document storage application 110, upon receiving the request, may perform authentication of the request by checking whether the user 102 is an authorized user of the document 'ABC.DOC'. Once the authentication is successful, the secured document storage application 110 may determine whether the third-party application 114 is the trusted third-party application or the non-trusted third-party application. The steps performed in case of non-trusted third-party application and in case of the trusted third-party application which is incapable of recognizing the plurality of access rights, are explained with reference to FIGS. 1 to 5, and for the sake of brevity, the steps herein are not explained again in detail.

The user 102 may then be able to perform the document relation operation on the document using the third-party application 114 as shown in FIG. 6.

Figure 7:
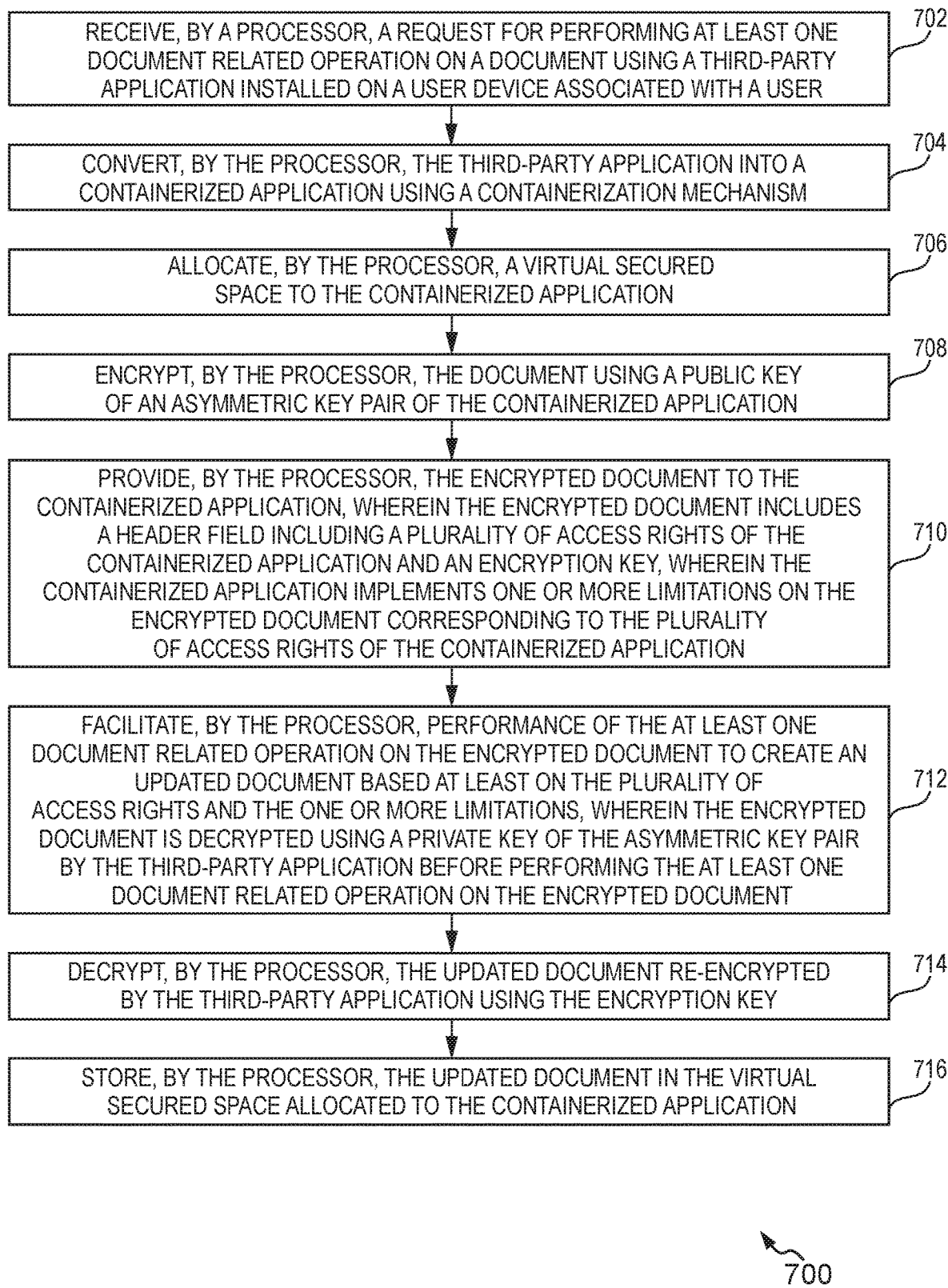
FIG. 7 is flowchart illustrating a method for performing exchange of data with the non-trusted third-party application, in accordance with an example embodiment.

FIG. 7 is a flowchart illustrating a method 700 for performing exchange of data with a non-trusted third-party application, in accordance with an example embodiment. The operations of the method 700 may be carried out by a server such as the server 108, the system 200 or the electronic devices 104 and 118. The sequence of operations of the method 700 may not to be necessarily executed in the same order as they are presented. Further, one or more operations may be grouped together and performed in form of a single step, or one operation may have several sub-steps that may be performed in parallel or in sequential manner.

At operation 702, the method 700 includes receiving, by a processor, a request for performing at least one document related operation on a document using a third-party application (e.g., the third-party application 114) installed on a user device (e.g., the user device 118) associated with a user (e.g., the user 116). In an example embodiment, the document is an encrypted document. The request may include user details of a user who wants to use the third-party application for performing the at least one document related operation on the securely stored document. The request may also include a public key of the third-party application. The user details may be used to authenticate the request. Examples of the third-party application include, but are not limited to, Microsoft Office®, Google Docs, ONLYOFFICE®, Paper, Zoho Docs etc.

At operation 704, the method 700 includes converting, by a processor, the third-party application into a containerized application using a containerization mechanism. As the third-party application is the non-trusted third-party application, the third-party application is converted into the containerized application using the containerization mechanism. The containerization mechanism may make the third-party application to run in a container environment that may have appropriately restricted secure computing resources to prevent the third-party application from exceeding a plurality of access rights granted to the third-party application. For example, if the access rights prohibit copying of the document, then the container environment may not have access to the Universal Serial Bus (USB) ports.

At operation 706, the method 700 includes allocating, by the processor, a virtual secured space to the containerized application. The virtual secured space is allocated to the containerized application. In an embodiment, the virtual secured space is an encrypted virtual hard disk space on the user device which is available only for the consumption by the containerized application.

At operation 708, the method 700 includes encrypting, by the processor, the document using the public key of an asymmetric key pair of the containerized application. In an example embodiment, the encryption of the document is performed after performing decryption of the document as the document is the encrypted document. The decrypted document is encrypted again using the public key of the containerized application to add an extra layer of protection before providing the encrypted document to the containerized application.

At operation 710, the method 700 includes providing, by the processor, the encrypted document to the containerized application. The encrypted document includes a header field that includes the plurality of access rights of the containerized application and an encryption key. In an embodiment, the encryption key is generated either using a Diffie-Hellman key exchange method or by using post quantum cryptography. The containerized application implements one or more limitations on the encrypted document corresponding to the plurality of access rights of the containerized application. For example, if the access rights restrict copy creation of the document, then the containerized application may restrict the copy creation to the encrypted virtual secured space allocated to the containerized application, thereby restricting copy creation outside the containerized environment.

At operation 712, the method 700 includes facilitating, by the processor, performance of the at least one document related operation on the encrypted document to create an updated document based at least on the plurality of access rights and the one or more limitations. The user may be allowed to perform the document related operation on the received document once the encrypted document is decrypted by the third-party application using a private key of the asymmetric key pair of the third-party application. The user may only be allowed to perform operations that are not under the limitations implemented by the containerized application.

At operation 714, the method 700 includes decrypting, by the processor, the updated document re-encrypted by the third-party application using the encryption key. The containerized application may re-encrypt the updated document before returning the updated document using the encryption key. So, the encrypted updated document is decrypted using the same encryption key included in the header of the updated document.

At operation 716, the method 700 includes storing, by the processor, the updated document in the virtual secured space allocated to the containerized application. The updated document is stored in the virtual secured space i.e. the encrypted virtual hard disk space on the user device that is restricted to be only used by containerized application. The method 700 ends at operation 716.

Figure 8:
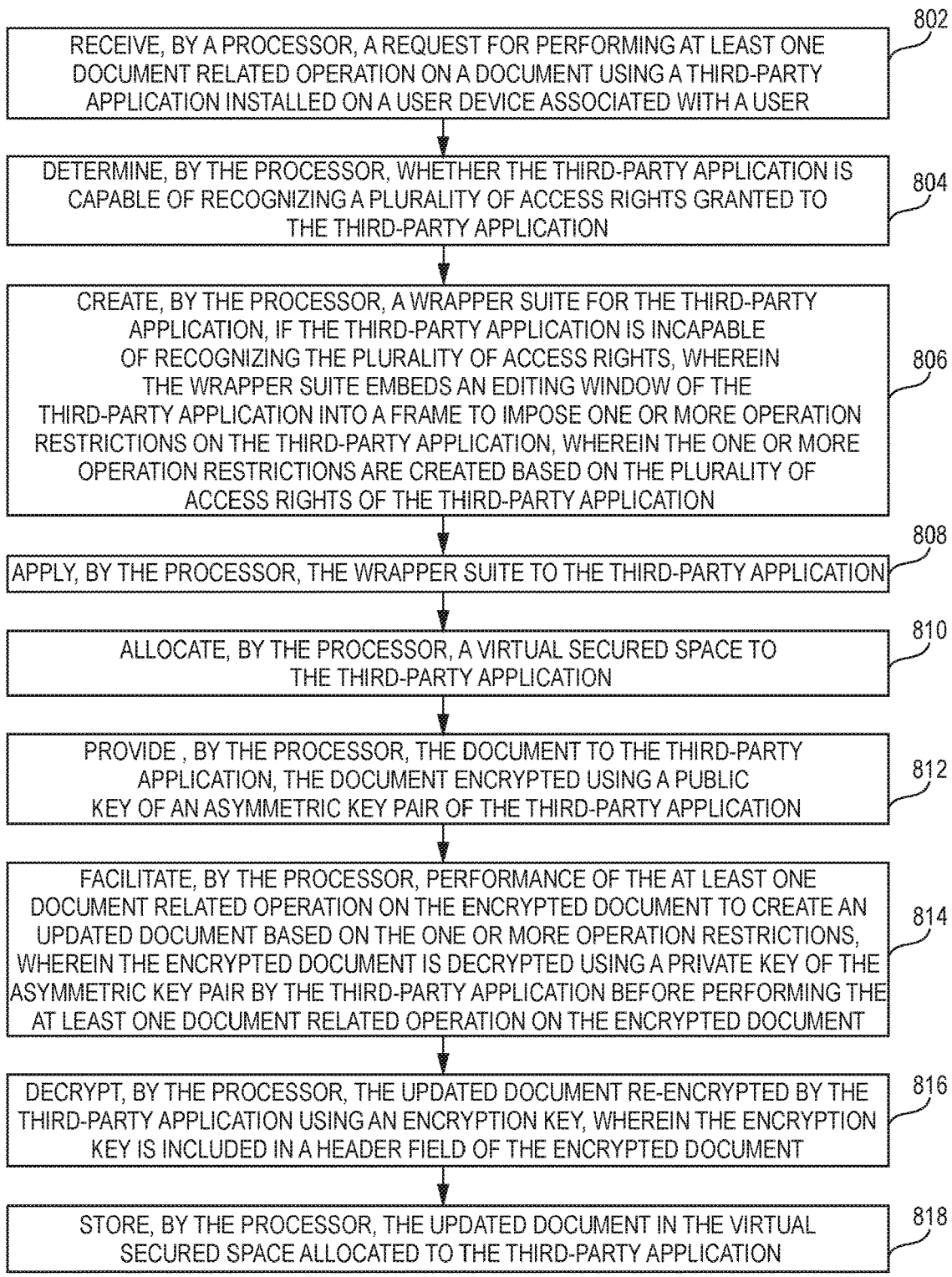
FIG. 8 is flowchart illustrating another method for performing exchange of data with the trusted third-party application, in accordance with an example embodiment.

FIG. 8 is a flowchart illustrating a method 800 for performing exchange of data with a trusted third-party application which is incapable of recognizing a plurality of access rights granted to the third-party application, in accordance with an example embodiment. The operations of the method 800 may be carried out by a server such as the server 108, the system 200 or the electronic devices 104 and 118. The sequence of operations of the method 800 may not to be necessarily executed in the same order as they are presented. Further, one or more operations may be grouped together and performed in form of a single step, or one operation may have several sub-steps that may be performed in parallel or in sequential manner.

At operation 802, the method 800 includes receiving, by a processor, a request for performing at least one document related operation on a document using a third-party application i.e. trusted third-party application installed on a user device associated with a user. The request may include user details of a user (e.g., the user 116) who wants to use the third-party application for performing the at least one document related operation on the document. The request may also include a private key of the third-party application. The user details may be used to authenticate the request.

At operation 804, the method 800 includes determining, by a processor, whether the third-party application is capable of recognizing a plurality of access rights granted to the third-party application. Whether the third-party application has accepted restrictions that are provided in form of the plurality of access rights is determined.

At operation 806, the method 800 includes creating, by the processor, a wrapper suite for the third-party application if the third-party application is found to be incapable of recognizing the plurality of access rights. The wrapper suite embeds an editing window of the third-party application into a frame to impose one or more operation restrictions on the third-party application.

At operation 808, the method 800 includes applying, by the processor, the wrapper suite to the third-party application. The wrapper suite is applied to the third-party application to implement the one or more operation restrictions on the document. The one or more operation restrictions may constrain away the menu and keystroke operations on the document that are generally available in any application, thereby controlling actions that exceed the access rights granted for manipulating the document.

At operation 810, the method 800 includes allocating, by the processor, a virtual secured space to the containerized application. The virtual secured space is allocated to the third-party application. At operation 812, the method 800 includes providing, by the processor, the document to the third-party application. The document is encrypted using a public key of an asymmetric key pair of the third-party application before providing the document to the third-party application. In an example embodiment, the document is decrypted first before performing encryption of the document as the document is the encrypted document. The document is encrypted again using the public key of the containerized application to add an extra layer of protection before providing the document to the third-party application. The encrypted document is provided to the third-party application requesting to perform document related operations on the document. The encrypted document includes an encryption key in a header field of the encrypted document.

At operation 814, the method 800 includes facilitating, by the processor, performance of the at least one document related operation on the encrypted document to create an updated document based on the one or more operation restrictions. The user may be allowed to perform the document related operation on the document once the encrypted document is decrypted by the third-party application using a private key of the asymmetric key pair. The user may only get to perform document related operations that are allowed to the third-party application. For example, if the access rights restrict downloading of the document, the user may not get 'download' in menu operations provided for the document, thereby restricting the user from downloading the document. Further, location of the user device during the use of the third-party application by the user may also be tracked using a device tracking mechanism. In an embodiment, the device tracking mechanism can be any known device tracking mechanism, such as GPS tracking. The tracked location is further checked to see whether the location of the user device is an authorized location or an unauthorized location. The access of the encrypted document to the third-party application is halted immediately upon determining that the location of the user device is the unauthorized location. Therefore, the user may not be able to perform any document related operation further.

At operation 816, the method 800 includes decrypting, by the processor, the updated document re-encrypted by the third-party application using the encryption key. The third-party application may re-encrypt the updated document before returning the updated document using the encryption key. So, the encrypted updated document is decrypted using the same encryption key included in the header of the updated document.

At operation 818, the method 800 includes storing, by the processor, the updated document in the virtual secured space allocated to the third-party application. The updated document is stored in the virtual secured space i.e. the encrypted virtual hard disk space on the user device that is restricted to be only used by third-party application. The method 800 ends at operation 818.

Figure 9:
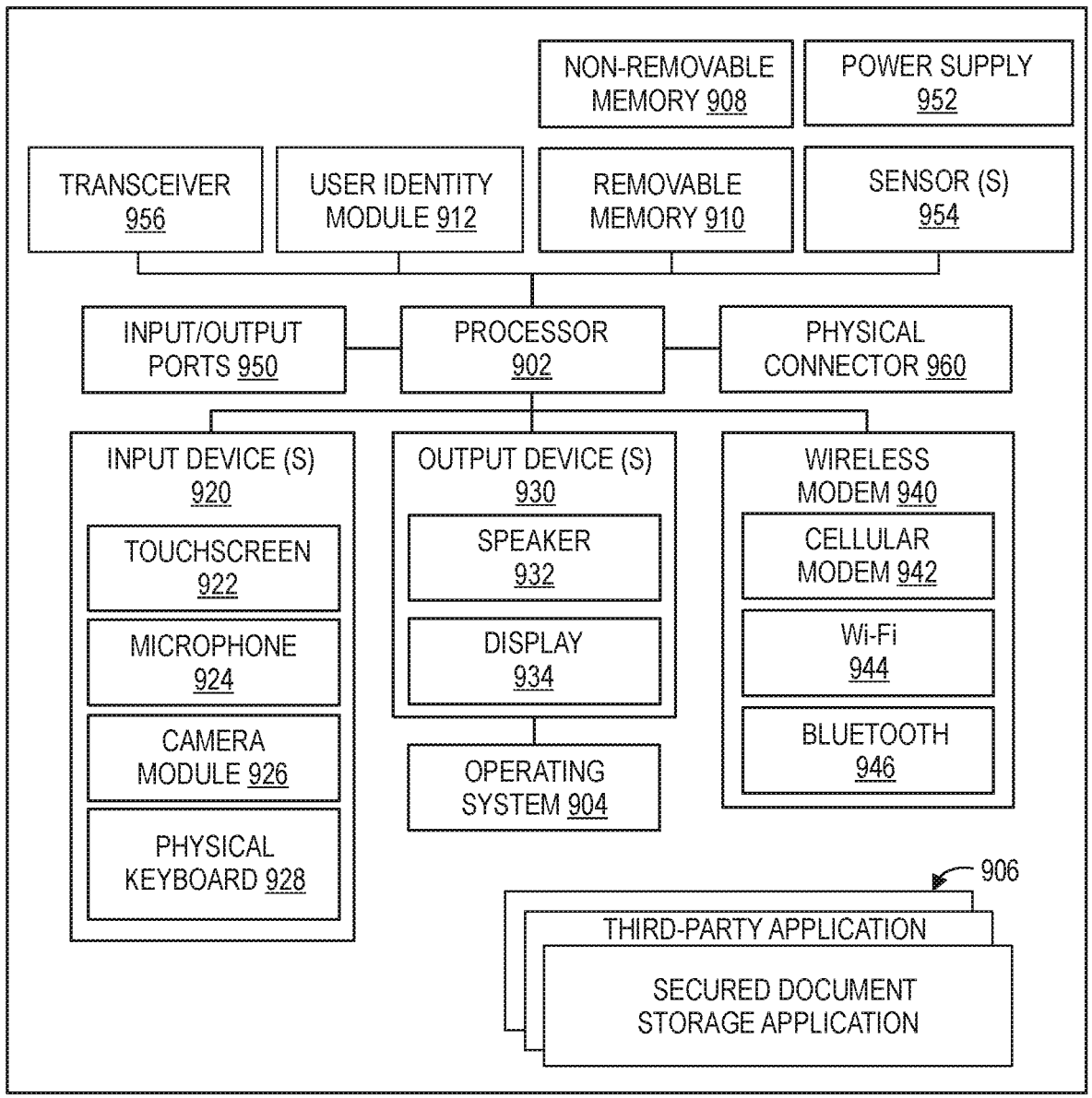
FIG. 9 is a block diagram of an electronic device capable of implementing the various embodiments of the present disclosure, in accordance with an example embodiment.

FIG. 9 shows a simplified block diagram of an electronic device 900 capable of implementing the various embodiments of the present disclosure. The electronic device 900 may be an example of the electronic devices 104, and 118. It should be understood that the electronic device 900 as illustrated and hereinafter described is merely illustrative of one type of device and should not be taken to limit the scope of the embodiments. As such, it should be appreciated that at least some of the components described below in connection with the electronic device 900 may be optional and thus in an example embodiment may include more, less or different components than those described in connection with the example embodiment of the FIG. 9. As such, among other examples, the electronic device 900 could be any of an electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the electronic device 900 and provides support for one or more programs such as a secured document storage application and a third-party application that implements one or more of the innovative features described herein. The applications 906 may include common mobile computing applications (e.g., telephony applications, email applications, calendars, contact managers, web browsers, messaging applications such as USSD messaging or SMS messaging or SIM Tool Kit (STK) application) or any other computing application.

The illustrated electronic device 900 includes one or more memory components, for example, a non-removable memory 908 and/or a removable memory 910. The non-removable memory 908 and/or the removable memory 910 may be collectively known as storage device/module in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904. The electronic device 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to a speaker 932 and a display 934. Other possible output devices can include piezoelectric or other haptic output devices. Some devices can serve more than one input/output function. For example, the touch screen 922 and the display 934 can be combined into a single input/output device.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the electronic device 900 and a public switched telephone network (PSTN).

The electronic device 900 can further include one or more input/output ports 950, a power supply 952, one or more sensors 954 for example, an accelerometer, a gyroscope, a compass, a global positioning system sensor (for providing location details) or an infrared proximity sensor for detecting the orientation or motion of the electronic device 900, a transceiver 956 (for wirelessly transmitting analog or digital signals) and/or a physical connector 960, which can be a USB port, IEEE 1294 (FireWire) port, and/or RS-232 port.

The illustrated components are not required or all-inclusive, as any of the components shown can be deleted and other components can be added.

The disclosed systems and methods with reference to FIGS. 1 to 9, or one or more operations of the methods 700 and 800 and the sequence flow diagrams 300, 400 and 500 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

FIG. 10 is a simplified block diagram of a server system 1000, in accordance with one embodiment of the present disclosure. The server system 1000 is an example of the server 108 and the third-party application server 112 shown and explained with reference to FIG. 1. The server system 1000 includes a computer system 1005 and one or more databases, such as a database 1010.

The computer system 1005 includes a processor 1015 for executing instructions. Instructions may be stored in, for example, but not limited to, a memory 1020. The processor 1015 may include one or more processing units (e.g., in a multi-core configuration). The processor 1015 is operatively coupled to a communication interface 1025 such that the computer system 1005 is capable of communicating with a remote device such as an electronic device 1035. Example of the electronic device 1035 may include, but is not limited to, the electronic devices 104, and 118 shown in FIG. 1.

The processor 1015 may also be operatively coupled to the database 1010. The database 1010 is any computer-operated hardware suitable for storing and/or retrieving data. The database 1010 may include multiple storage units such as hard disks and/or solid-state disks in a redundant array of inexpensive disks (RAID) configuration. The database 1010 may include, but not limited to, a storage area network (SAN) and/or a network attached storage (NAS) system.

In some embodiments, the database 1010 is integrated within the computer system 1005. For example, the computer system 1005 may include one or more hard disk drives as the database 1010. In other embodiments, the database 1010 is external to the computer system 1005 and may be accessed by the computer system 1005 using a storage interface 1030. The storage interface 1030 is any component capable of providing the processor 1015 with access to the database 1010. The storage interface 1030 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1015 with access to the database 1010.

The memory 1020 is a storage device embodied as one or more volatile memory devices, one or more non-volatile memory devices, and/or a combination of one or more volatile memory devices and non-volatile memory devices, for storing micro-contents information and instructions. The memory 1020 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Various example embodiments offer, among other benefits, techniques for establishing methods and systems for performing exchange of data with (non) trusted third-party applications. The system converts the non-trusted third-party application into a containerized application which runs in a containerized environment, thereby ensuring that unprotected document copies are not available outside the containerized environment. The system applies the wrapper suite to the trusted third-party applications which are incapable of recognizing the access rights, thereby ensuring operations that respect limitations imposed on the document are performed by the user on the document.

Although the invention has been described with reference to specific exemplary embodiments, it is noted that various modifications and changes may be made to these embodiments without departing from the broad spirit and scope of the invention. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus creates a means for implementing the functions specified in the flowchart block or blocks, although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory medium or means that can contain, store, communicate, propagate or transport the instructions for use by or in connection with an instruction execution system, apparatus, or device, such as a computer. A computer-readable medium may include a computer-readable storage medium that may be any medium or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such are intended to cover the application and\or implementation without departing from the spirit or scope of the claims.

What is claimed is:

1. A computer-implemented method, comprising:
   receiving, by a processor, a request for performing at least one document related operation on a document using a third-party application installed on a user device associated with a user;
   converting, by the processor, the third-party application into a containerized application using a containerization mechanism;
   allocating, by the processor, a virtual secured space to the containerized application;
   encrypting, by the processor, the document using a public key of an asymmetric key pair of the containerized application;
   providing, by the processor, the encrypted document to the containerized application, wherein the encrypted document comprises a header field comprising a plurality of access rights of the containerized application and an encryption key, and wherein the containerized application implements one or more limitations on the encrypted document corresponding to the plurality of access rights of the containerized application;
   facilitating, by the processor, performing of the at least one document related operation on the encrypted document to create an updated document based at least on the plurality of access rights and the one or more limitations, wherein the encrypted document is decrypted using a private key of the asymmetric key pair by the third-party application before performing the at least one document related operation on the encrypted document;
   decrypting, by the processor, the updated document re-encrypted by the third-party application using the encryption key; and
   storing, by the processor, the updated document in the virtual secured space allocated to the containerized application.

2. The method as claimed in claim 1, wherein the third-party application is a non-trusted third-party application.

3. The method as claimed in claim 2, wherein the document is an encrypted document.

4. The method as claimed in claim 3, wherein encrypting the document using the public key comprises:
   decrypting, by the processor, the encrypted document; and
   encrypting, by the processor, a decrypted document using the public key of the asymmetric key pair of the containerized application.

5. The method as claimed in claim 2, wherein converting the third-party application into the containerized application using the containerization mechanism comprises:
   performing, by the processor, authentication of the request for performing the at least one document related operation on the document by checking whether the user is an authorized user of the document; and
   upon successful authentication of the request, converting, by the processor, the third-party application into the containerized application.

6. The method as claimed in claim 5, further comprising:
   receiving, by the processor, an unmodified version of the third-party application; and
   deploying, by the processor, the unmodified version of the third-party application in a container to generate the containerized application.

7. The method as claimed in claim 2, further comprising:
   upon detecting termination of the containerized application on the user device, performing, by the processor, deletion of the virtual secured space allocated to the containerized application.

8. The method as claimed in claim 2, further comprising:
   performing, by the processor, scanning of one or more documents stored in the virtual secured space to determine one or more sensitive portions of the one or more documents; and
   encrypting, by the processor, the one or more sensitive portions of the one or more documents using an encryption algorithm, wherein the encryption of the one or more sensitive portions is performed before creating a copy of the one or more documents of the virtual secured space in a memory of the user device.

9. The method as claimed in claim 2, wherein the one or more limitations comprise forbidding one or more of a printing of the document, a downloading of the document, a reading of the document, an editing of the document, a copying of the document, and a deletion of the document.

10. A server system, comprising:
    a communication interface configured to receive a request for performing at least one document related operation on a document using a third-party application installed on a user device associated with a user;
    a memory comprising executable instructions; and
    a processor communicably coupled to the communication interface and configured to execute the instructions to cause the server system to at least:
        convert the third-party application into a containerized application using a containerization mechanism;
        allocate a virtual secured space to the containerized application;

encrypt the document using a public key of an asymmetric key pair of the containerized application;

provide the encrypted document to the containerized application, wherein the encrypted document comprises a header field comprising a plurality of access rights of the containerized application and an encryption key, and wherein the containerized application implements one or more limitations on the encrypted document corresponding to the plurality of access rights of the containerized application;

facilitate performing of the at least one document related operation on the encrypted document to create an updated document based at least on the plurality of access rights and the one or more limitations, wherein the encrypted document is decrypted using a private key of the asymmetric key pair by the third-party application before performing the at least one document related operation on the encrypted document;

decrypt the updated document re-encrypted by the third-party application using the encryption key; and store the updated document in the virtual secured space allocated to the containerized application.

11. The server system as claimed in claim 10, wherein the third-party application is a non-trusted third-party application.

12. The server system as claimed in claim 11, wherein for converting the third-party application into the containerized application using the containerization mechanism, the server system is further caused to:

perform authentication of the request for performing the at least one document related operation on the document by checking whether the user is an authorized user of the document; and upon successful authentication of the request, convert the third-party application into the containerized application.

13. The server system as claimed in claim 12, wherein the server system is further caused to:

receive an unmodified version of the third-party application; and deploy the unmodified version of the third-party application in a container to generate the containerized application.

14. The server system as claimed in claim 11, wherein upon detecting termination of the containerized application on the user device, the server system is further caused to:

perform deletion of the virtual secured space allocated to the containerized application.

15. The server system as claimed in claim 11, wherein the server system is further caused to:

perform scanning of one or more documents stored in the virtual secured space to determine one or more sensitive portions of the one or more documents; and encrypt the one or more sensitive portions of the one or more documents using an encryption algorithm, wherein the encryption of the one or more sensitive portions is performed before creating a copy of the one or more documents of the virtual secured space in a memory of the user device.

16. A computer-implemented method, comprising:

receiving, by a processor, a request for performing at least one document related operation on a document using a third-party application installed on a user device associated with a user;

determining, by the processor, whether the third-party application is capable of recognizing a plurality of access rights granted to the third-party application;

if the third-party application is incapable of recognizing the plurality of access rights, performing:

creating, by the processor, a wrapper suite for the third-party application, wherein the wrapper suite embeds an editing window of the third-party application into a frame to impose one or more operation restrictions on the third-party application, wherein the one or more operation restrictions are created based on the plurality of access rights of the third-party application;

applying, by the processor, the wrapper suite to the third-party application;

allocating, by the processor, a virtual secured space to the third-party application;

providing, by the processor, the document to the third-party application, the document encrypted using a public key of an asymmetric key pair of the third-party application;

facilitating, by the processor, performing of the at least one document related operation on the encrypted document to create an updated document based on the one or more operation restrictions, wherein the encrypted document is decrypted using a private key of the asymmetric key pair by the third-party application before performing the at least one document related operation on the encrypted document;

decrypting, by the processor, the updated document re-encrypted by the third-party application using an encryption key, wherein the encryption key is included in a header field of the encrypted document; and storing, by the processor, the updated document in the virtual secured space allocated to the third-party application.

17. The method as claimed in claim 16, wherein the third-party application is a trusted third-party application.

18. The method as claimed in claim 17, further comprising:

if the third-party application is capable of recognizing the plurality of access rights, performing:

allocating, by the processor, a virtual secured space to the third-party application;

providing, by the processor, the document to the third-party application, the document encrypted using the public key of the asymmetric key pair of the third-party application;

facilitating, by the processor, performance of the at least one document related operation on the encrypted document to create an updated document based on the plurality of access rights of the third-party application, wherein the encrypted document is decrypted using a private key of the asymmetric key pair by the third-party application before performing the at least one document related operation on the encrypted document;

decrypting, by the processer, the updated document re-encrypted by the third-party application using the encryption key; and storing, by the processor, the updated document in the virtual secured space allocated to the third-party application.

19. The method as claimed in claim 17, further comprising:
- performing, by the processor, scanning of one or more documents stored in the virtual secured space to determine one or more sensitive portions of the one or more documents; and
- encrypting, by the processor, the one or more sensitive portions of the one or more documents using an encryption algorithm, wherein the encryption of the one or more sensitive portions is performed after detecting termination of the third-party application on the user device.

20. The method as claimed in claim 17, wherein the one or more operation restrictions comprise disabling one or more of a print operation, a save operation, a copy operation, a paste operation, and a download operation and performing redaction of one or more sensitive contents present in the document.

\* \* \* \* \*